(12) United States Patent
Sherman et al.

(10) Patent No.: US 9,555,602 B2
(45) Date of Patent: Jan. 31, 2017

(54) METHOD FOR PREPARING MICROSTRUCTURED LAMINATING ADHESIVE ARTICLES

(75) Inventors: Audrey A. Sherman, St. Paul, MN (US); Wendi J. Winkler, Minneapolis, MN (US); Mieczyslaw H. Mazurek, Roseville, MN (US); Henri Garcia, Madrid (ES); Daniel Toro, Madrid (ES)

(73) Assignee: 3M Innovative Properties Company, St. Paul, MN (US)

( * ) Notice: Subject to any disclaimer, the term of this patent is extended or adjusted under 35 U.S.C. 154(b) by 886 days.

(21) Appl. No.: 11/372,759

(22) Filed: Mar. 10, 2006

(65) Prior Publication Data

US 2007/0212535 A1    Sep. 13, 2007

(51) Int. Cl.
| | |
|---|---|
| *B32B 7/12* | (2006.01) |
| *B32B 27/08* | (2006.01) |
| *B32B 37/12* | (2006.01) |
| *C09J 7/02* | (2006.01) |
| *B32B 27/30* | (2006.01) |
| *B32B 17/10* | (2006.01) |
| *B32B 37/00* | (2006.01) |
| *B32B 38/06* | (2006.01) |

(52) U.S. Cl.
CPC ......... *B32B 27/08* (2013.01); *B32B 17/10036* (2013.01); *B32B 17/10587* (2013.01); *B32B 17/10697* (2013.01); *B32B 17/10743* (2013.01); *B32B 27/308* (2013.01); *B32B 37/12* (2013.01); *C09J 7/0207* (2013.01); *C09J 7/0232* (2013.01); *B32B 37/003* (2013.01); *B32B 38/06* (2013.01); *B32B 2307/412* (2013.01); *B32B 2405/00* (2013.01); *B32B 2551/00* (2013.01); *B32B 2605/006* (2013.01); *C09J 2201/28* (2013.01); *Y10T 428/28* (2015.01)

(58) Field of Classification Search
USPC .................. 428/40.1, 156, 343, 354, 355 R, 355 AC, 428/355 BL, 356
See application file for complete search history.

(56) References Cited

U.S. PATENT DOCUMENTS

| | | | |
|---|---|---|---|
| 5,246,762 A | 9/1993 | Nakamura | |
| 5,296,277 A * | 3/1994 | Wilson et al. | 428/40.2 |
| 5,650,215 A * | 7/1997 | Mazurek | B29C 43/222 428/156 |
| 5,889,118 A * | 3/1999 | Delgado et al. | 525/228 |
| 6,123,890 A | 9/2000 | Mazurek et al. | |
| 6,168,682 B1 * | 1/2001 | Bennett | G11B 7/26 156/295 |
| 6,299,956 B1 | 10/2001 | Freedman | |
| 6,630,218 B1 * | 10/2003 | Abe | 428/40.1 |
| 6,911,243 B2 | 6/2005 | Sher | |
| 7,892,649 B2 * | 2/2011 | Sherman | C09J 7/0207 428/343 |
| 2001/0007003 A1 * | 7/2001 | Karim et al. | 525/330.5 |
| 2001/0051264 A1 * | 12/2001 | Mazurek et al. | 428/343 |
| 2003/0082371 A1 * | 5/2003 | Mazurek et al. | 428/343 |
| 2003/0178124 A1 | 9/2003 | Mikami | |
| 2003/0218274 A1 * | 11/2003 | Boutilier et al. | 264/284 |
| 2004/0241393 A1 * | 12/2004 | Thakkar et al. | 428/156 |
| 2005/0013958 A1 * | 1/2005 | Callahan et al. | 428/40.1 |
| 2008/0196822 A1 * | 8/2008 | Satoh et al. | 156/219 |
| 2016/0114568 A1 * | 4/2016 | Sher | B32B 7/12 156/219 |
| 2016/0115356 A1 * | 4/2016 | Free | C09J 7/0232 156/196 |

FOREIGN PATENT DOCUMENTS

| | | | | |
|---|---|---|---|---|
| JP | 59-78285 | * | 5/1984 | |
| JP | 2003-336020 | | 11/2003 | |
| JP | 2003336020 A | * | 11/2003 | |
| WO | WO95/11945 | * | 5/1995 | .............. C09J 7/02 |
| WO | WO9935201 | * | 7/1999 | .............. C09J 7/02 |
| WO | WO 00/69985 | | 11/2000 | |
| WO | WO 02/094960 | * | 11/2002 | |
| WO | WO 03/099953 | | 12/2003 | |

OTHER PUBLICATIONS

Harry R. Allcock et al., "Contemporary Polymer Chemistry", Pearson Education Inc., New Jersey, Third Edition, Chapter 7, p. 184, 2003.*
Harry R. Allcock et al., "Contemporary Polymer Chemistry", 2003, Pearson Education, Inc., p. 5.*

* cited by examiner

*Primary Examiner* — Anish Desai
(74) *Attorney, Agent, or Firm* — Jeffrey M. Olofson (57) ABSTRACT

A method of making a microstructured adhesive article that includes (a) providing an article comprising a crosslinked pressure sensitive adhesive layer disposed on a backing; and (b) embossing the surface of the crosslinked pressure sensitive adhesive layer to form a crosslinked pressure sensitive adhesive layer having a microstructured adhesive surface.

12 Claims, 1 Drawing Sheet

METHOD FOR PREPARING MICROSTRUCTURED LAMINATING ADHESIVE ARTICLES

TECHNICAL FIELD

This invention relates to methods for making microstructured laminating adhesive articles.

BACKGROUND

Microstructured adhesive articles have been prepared by applying a flowable pressure sensitive adhesive to the surface of a microstructured release liner or the surface of a microstructured molding tool. The process results in the creation of an adhesive having a microstructured surface. When the resulting articles are dry laminated under pressure to substrates such as glass or polymer films, the microstructural features created in the adhesive surface allow air to escape from the bonding interface, thereby minimizing or preventing the formation of bubbles and pinholes.

During lamination, the microstructural features flatten out and wet the substrate surface under the influence of applied pressure. In the process, however, stresses are introduced into the adhesive as the adhesive relaxes and tries to return to its initial microstructured state. These stresses can create defects in the adhesive that adversely affect its optical properties.

SUMMARY

A method of making a microstructured adhesive article is described that includes (a) providing an article comprising a crosslinked pressure sensitive adhesive layer disposed on a backing; and (b) embossing the surface of the crosslinked pressure sensitive adhesive layer to form a crosslinked pressure sensitive adhesive layer having a microstructured adhesive surface. Emboss means, for the purpose of the present application, deforming with pressure. In some embodiments, the crosslinked adhesive surface is embossed by contacting the surface with a microstructured release liner. In other embodiments, the crosslinked adhesive surface is embossed by contacting the surface with a microstructured molding tool. The resulting articles may be dry laminated to a variety of substrates, including rigid substrates such as glass, and are particularly useful for optical applications where low haze, low opacity, and high luminous transmittance are desirable.

Embossing the surface of a crosslinked pressure sensitive adhesive to create a microstructured adhesive surface minimizes the formation of stresses within the adhesive after lamination because both the pre-structured and final states of the adhesive are substantially planar. Therefore, the structure is unstable when not in contact with the microstructured liner or molding tool. This is in contrast to microstructured adhesives produced by coating a flowable adhesive onto a microstructured release liner or a microstructured molding tool, where the initial state of the adhesive to which it tries to return is that of the microstructured configuration, while the final state is substantially planar.

The details of one or more embodiments of the invention are set forth in the accompanying drawings and the description below. Other features, objects, and advantages of the invention will be apparent from the detailed description, and from the claims.

DETAILED DESCRIPTION

Microstructured adhesive articles are prepared by embossing the surface of a crosslinked pressure sensitive adhesive layer disposed on a backing to create an adhesive having a microstructured adhesive surface. The thickness of the adhesive layer is selected based upon the application for which the articles are intended. In general, the thickness ranges from about 10 micrometers (about 0.4 mils) to about 1500 micrometers (about 60 mils).

The microstructural features are generally three-dimensional structures that are microscopic in at least two dimensions (i.e., the topical and/or cross-sectional view is microscopic). The term "microscopic" as used herein refers to dimensions that are difficult to resolve by the human eye without aid of a microscope. One useful definition of microscopic is found in Smith, *Modern Optic Engineering*, (1966), pages 104-105, wherein visual acuity is defined and measured in terms of the angular size of the smallest character that can be recognized. Normal visual acuity allows detection of a character that subtends an angular height of 5 minutes of arc on the retina.

The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the article is laminated to a substrate. In this regard, V-grooves and channels that extend to the edge of the article are particularly useful. The particular dimensions and patterns characterizing the microstructural features are selected based upon the specific application for which the article is intended.

Embossing may be accomplished by contacting the crosslinked adhesive surface with a microstructured molding tool, as described in Mazurek et al., U.S. Pat. No. 5,650,215, which is incorporated by reference in its entirety. The tool can be in form of a planar stamping press, flexible or inflexible belts, or a roller. The topography of the tool used to create the embossed microstructural features can be prepared using techniques such as, for example, chemical etching, mechanical etching, laser ablation, photolithography, stereolithography, micromachining, knurling, cutting, scoring, and the like.

Embossing may also be accomplished by contacting the crosslinked adhesive surface with a microstructured release liner, as described in the aforementioned Mazurek et al. patent. Suitable liners are capable of being placed in intimate contact with the crosslinked pressure sensitive adhesive and subsequently removed without damaging the adhesive layer. Examples include polyethylene, polypropylene, polyester, cellulose acetate, polyvinylchloride, and polyvinylidene films, as well as paper. The liners may include silicone release coatings. Commercially available examples include liners available from 3M Company (St. Paul, Minn.), Rexam Corp. (Iowa City, Iowa), Daubert Coated Products (Westchester, Ill.), P.S. Substrates, Inc., Schoeller Technical Papers, Inc., Mondi Inncoat GMBH, and P.W.A. Kunstoff GMBH.

The adhesive is disposed on a backing. The backing may be removable (such as a release liner, including a microstructured release liner such as described above or a carrier film) or non-removable such as a polymeric film or a rigid or non-rigid substrate.

Pressure sensitive adhesive (PSA) compositions are well known to those of ordinary skill in the art to possess properties including (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power.

The pressure sensitive adhesives are crosslinked prior to embossing. Examples of suitable adhesives include crosslinked acrylics, rubbers, thermoplastic elastomers, silicones, and the like.

In a preferred embodiment, the pressure sensitive adhesive is based on at least one poly(meth)acrylate (i.e., a (meth)acrylic pressure sensitive adhesive). Particularly preferred poly(meth)acrylates are derived from: (A) at least one monoethylenically unsaturated alkyl(meth)acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl(meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Preferably, monomer A has a homopolymer Tg of no greater than about 0° C. Preferably, the alkyl group of the (meth) acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, polyethoxylated or -propoxylated methoxy(meth)acrylates such as acrylates of CARBOWAX (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Preferably, monomer B has a homopolymer Tg of at least about 10° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

The preferred acrylate copolymer is formulated to have a resultant Tg of less than about 0° C. and more preferably, less than about −10° C. Such acrylate copolymers preferably include about 60 parts to about 98 parts per hundred of at least one monomer A and about 2 parts to about 40 parts per hundred of at least one monomer B. Preferably, the acrylate copolymers have about 85 parts to about 98 parts per hundred or at least one monomer A and about 2 parts to about 15 parts of at least one monomer B.

A crosslinking agent is used to build the molecular weight and the strength of the copolymer. Preferably, the crosslinking agent is one that is copolymerized with monomers A and B. The crosslinking agent may produce chemical crosslinks (e.g., covalent bonds or ionic bonds). Alternatively, it may produce thermally reversible physical crosslinks that result, for example, from the formation of reinforcing domains due to phase separation of hard segments (i.e., those having a Tg higher than room temperature, preferably higher than 70° C.) such as the styrene macromers of U.S. Pat. No. 4,554, 324 (Husman) and/or acid/base interactions (i.e., those involving functional groups within the same polymer or between polymers or between a polymer and an additive) such polymeric ionic crosslinking as described in WO 99/42536. Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e. g., radiation having a wavelength of about 250 nanometers to about 400 nanometers), causes the copolymer to crosslink.

The crosslinking agent is used in an effective amount, by which is meant an amount that is sufficient to cause crosslinking of the pressure sensitive adhesive to provide adequate cohesive strength to produce the desired final adhesion properties to the substrate of interest. Preferably, the crosslinking agent is used in an amount of about 0.1 part to about 10 parts, based on the total amount of monomers.

Rubber-based pressure sensitive adhesives are generally of 2 classes, natural rubber-based or synthetic rubber-based.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon. Antioxidants are used to retard the oxidative attack on natural rubber, which can result in loss of the cohesive strength of the natural rubber adhesive. Useful antioxidants include but are not limited to amines, such as N—N' di-beta-naphthyl-1,4-phenylenediamine, available as AgeRite D; phenolics, such as 2,5-di-(t-amyl)hydroquinone, available as Santovar A, available from Monsanto Chemical Co., tetrakis[methylene 3-(3',5'-di-tert-butyl-4'-hydroxyphenyl) propianate]methane, available as IRGANOX 1010 from Ciba-Geigy Corp., and 2,2'-methylenebis(4-methyl-6-tert butyl phenol), available as Antioxidant 2246; and dithiocarbamates, such as zinc dithiodibutyl carbamate. Curing agents are used to partially vulcanize (crosslink) the pressure sensitive adhesive.

Another useful class of pressure sensitive adhesives are those comprising synthetic rubber. Such adhesives are generally rubbery elastomers, which are either self-tacky or non-tacky and require tackifiers.

Self-tacky synthetic rubber pressure sensitive adhesives include, for example, butyl rubber, a copolymer of isobutylene with less than 3 percent isoprene, polyisobutylene, a homopolymer of isoprene, polybutadiene, or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich. Tackifiers that are useful include derivatives of rosins such as FORAL 85, a stabilized rosin ester from Hercules, Inc., the SNOWTACK series of gum rosins from Tenneco, and the AQUATAC series of tall oil rosins from Sylvachem; and synthetic hydrocarbon resins such as the PICCOLYTE A series, polyterpenes from Hercules, Inc., the ESCOREZ 1300 series of C5 aliphatic olefin-derived resins and the ESCOREZ 2000 Series of C9 aromatic/aliphatic olefin-derived resins. Curing agents are added to vulcanize (crosslink) the adhesive partially.

Thermoplastic elastomer pressure sensitive adhesives include styrene block copolymer pressure sensitive adhesives which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc. Resins that associate with the thermoplastic phase tend to stiffen the pressure sensitive adhesive. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCOVAR 130 alkyl aromatic polyindene resin, available from Hercules, Inc., and the PICCOTEX series of alphamethyl styrene/vinyl toluene resins, available from Hercules.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups (OSiMe3) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721(Dexter). Manufacture of silicone urea block copolymer pressure sensitive adhesive is described in U.S. Pat. No. 5,214,119 (Leir, et al).

As discussed above, the pressure sensitive adhesive is crosslinked prior to embossing using methods known in the art depending on the adhesive used. Crosslinking may be effected prior to embossing by means of covalent crosslinks, physical crosslinks or a combination thereof. The degree of crosslinking may be selected based upon the application for which the article is intended. Covalent crosslinks may be formed by incorporating a multi-functional monomer in the polymerization process, followed by curing using, e.g., ultraviolet thermal energy, radiation, ionizing radiation, moisture, or a combination thereof. Examples of physical crosslinks include high Tg polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows.

The crosslinked pressure sensitive adhesive can optionally include one or more additives such as initiators, filler, plasticizers, tackifiers, chain transfer agents, fibrous reinforcing agents, woven and non-woven fabrics, foaming agents, antioxidants, stabilizers, fire retardants, viscosity modifying agents, coloring agents, and mixtures thereof.

One class of useful crosslinked pressure sensitive adhesives includes adhesives having properties that make them suitable for optical applications. Examples of optical applications includes windows, vehicle windshields, displays, and the like. Useful adhesives are selected such that upon dry lamination to a substrate, the adhesive layer has a haze after lamination, measured according to ASTM D 1003-95, of less than about 50% (e.g., less than about 10%, preferably less than about 3%, and more preferably less than about 1%) of the haze of the adhesive layer before lamination. Such adhesives also preferably do not interfere with light transmission over the wavelength region of interest (e.g., the visible region). For example, after dry lamination, the adhesive layer may have a luminous transmittance of at least about 85%, preferably about 95% to about 99.9%, and a haze of less than about 25%, more preferably less than about 5% or even less than about 2%, as measured according to ASTM D 1003-95. In addition, the adhesive layer may have an opacity of less than about 3% (e.g., less than about 1% or 0.5%), as measured by a spectrophotometer using well-known analysis techniques.

In use, the microstructured release liner is removed and the microstructured adhesive surface is laminated to a substrate. During lamination, the microstructural features flatten out, thereby wetting the substrate surface, thereby forming a bond to the substrate surface. In the course of lamination, air bleeds out through the microstructural features to minimize or prevent the formation of bonding defects.

The air bleed feature is particularly important when dealing with lamination to rigid substrates, especially rigid-to-rigid lamination or where the object to be laminated is relatively large. Currently used methods to prevent defects in such laminations include techniques such as coating the adhesive layer with water or a water-detergent solution to prevent bubble formation during lamination. These techniques require removal of the water by evaporation. Bubble formation is particularly unacceptable in optical applications.

The substrate may be rigid or flexible. Examples of suitable substrates include glass, metal, plastic, wood, and ceramic substrates, painted surfaces of these substrates, and the like. Representative plastic substrates include polyester, polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. The substrate may also be a woven fabric formed form threads of synthetic or natural materials such as, for example, cotton, nylon, rayon, glass, or ceramic material. The substrate may also be made of a nonwoven fabric such as air laid webs of natural or synthetic fibers or blends thereof.

Particularly useful substrates for optical applications include substrates that are substantially specular such as glass, clear polymeric materials, and the like. The adhesive forms a substantially specular adhesive layer when permanently bonded to such a substrate. The term "substantially specular" as used herein refers to a material that absorbs substantially no light over a wavelength region of interest, i.e., substantially all light over the wavelength region of interest that falls on the surface of the substantially specular material is reflected or transmitted.

It is also possible to form a structure whereby the adhesive is sandwiched between two substrates. A specific example of such a structure is a window. In such applications, one or both adhesive surfaces has a microstructured topography. The second substrate may be selected from the examples of substrates set forth above.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
| --- | --- |
| Adhesive Laminate-1 | 3M Optically Clear Adhesive 8141, adhesive thickness 25 micrometers (1 mil) between 2 release liners, used as obtained. Commercially available from 3M Company, St. Paul, MN. |
| Adhesive Laminate-2 | 3M Optically Clear Adhesive 8142, adhesive thickness 51 micrometers (2 mils) between 2 release liners, used as obtained. Commercially available from 3M Company, St. Paul, MN. |
| Adhesive Laminate-3 | 3M Paint Protection Film 84824, adhesive thickness 51 micrometers (2 mils) between a paper release liner and a urethane film, used as obtained. Commercially available from 3M Company, St. Paul, MN. |
| Adhesive Laminate-4 | A modified version of 3M Paint Protection Film 84824 (commercially available from 3M Company, St. Paul, MN) was prepared with the paper release liner replaced with polyethylene terephthalate release liner, adhesive thickness 51 micrometers (2 mils) between a polyethylene terephthalate liner and a urethane film. |
| Adhesive Laminate-5 | 3M Window Film CS35, adhesive thickness 10 micrometers (0.4 mils) between a polyethylene terephthalate release liner and a polyethylene terephthalate film. Commercially available from 3M Company, St. Paul, MN. |
| Adhesive Laminate-6 | 3M SCLAR 150 Window Film, adhesive thickness 51 micrometers (2.0 mils) between a polyethylene terephthalate release liner and a polyethylene terephthalate film. Commercially available from 3M Company, St. Paul, MN. |
| Adhesive Laminate-7 | VHB 4915 tape 1.5 millimeter thick and 25 millimeters wide commercially available from 3M Company, St. Paul, MN. |
| Liner-1 | Flat liners present with the commercial products sold under the tradenames 3M Optically Clear Adhesive 8141 and 3M Optically Clear Adhesive 8142. |
| Liner-2 | A polyethylene coated polyethylene terephthalate release liner with square pyramidal structures, pitch of 200 micrometers and a depth of 12 micrometers, sidewalls have an angle of about 8°. |
| Glass substrate | Glass plate of 4 millimeter thickness. |
| PMMA substrate | Polymethyl methacrylate plate of 3 millimeter thickness. |

Test Methods

180° Peel Adhesion

Adhesive laminates of backing, pressure sensitive adhesive and release liner were cut into 1.27 centimeter by 15 centimeter strips. The release liner was removed and the strip adhered to a 10 centimeter by 20 centimeter clean, solvent washed glass coupon using a 2 kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a 5 second data collection time. Two samples were tested; the reported adhesion value is an average of the two samples.

% Wet Out

Adhesive laminates of backing, pressure sensitive adhesive, and release liner were cut into 5.0 centimeter by 7.5 centimeter pieces. After the release liner was removed, the exposed adhesive face was placed carefully on to a clean glass slide with a minimal amount of pressure. After application an image was captured with a digital camera, and again at regular time intervals in the same spot on the sample. ImageJ (a shareware software package) was used to determine the area that was wetted by the adhesive, which was reported as % wet out.

Rebound Testing

This test measures whether an adhesive structure is unstable after removal from a microstructured liner or molding tool. Adhesive laminates of the backing, pressure sensitive adhesive, and microstructured liner were prepared by post-embossing the PSA of a sample with a microstructured release liner. The microstructured liner was removed from a sample of the post-embossed adhesive and the depth of the microstructured adhesive was measured in open air using a laser imaging interferometer (Zygo Corporation Middlefield, Conn. 06455). The depth of the microstructured adhesive was measured over time to observe how long it takes for the adhesive to lose the microstructured embossing and regain its pre-embossed state of flatness. An adhesive is unstable if it regains at least 50% of its pre-embossed state within 24 hours.

Visual Inspection Test

Three layer laminates of either glass/adhesive/glass or PMMA/adhesive/PMMA were prepared. These laminates were visually inspected for the presence of bubbles and rated on a 1 to 5 scale based upon the aesthetic appearance with 1 being lowest aesthetic appearance (or most bubbles) and 5 being the highest aesthetic appearance (or least bubbles).

Comparative Example C1

For Comparative Example C1 a sample of Adhesive Laminate-2 as obtained was tested for 180° Peel Adhesion as described in the Test Method above. The results are shown in Table 1.

Example 1

For Example 1 a sample of Adhesive Laminate-2 was obtained and one liner was removed and Liner-2 was laminated to the PSA using a laminator. Liner-2 was removed to determine whether the structure had embossed into PSA-1 surface. The embossed surface was placed in contact with a glass plate and pressure was applied with a simple finger rub-down to one half of the sample and the other half of the sample was left untouched. The rubbed portion showed complete wet out as viewed by the eye.

Example 2

Figure 1:
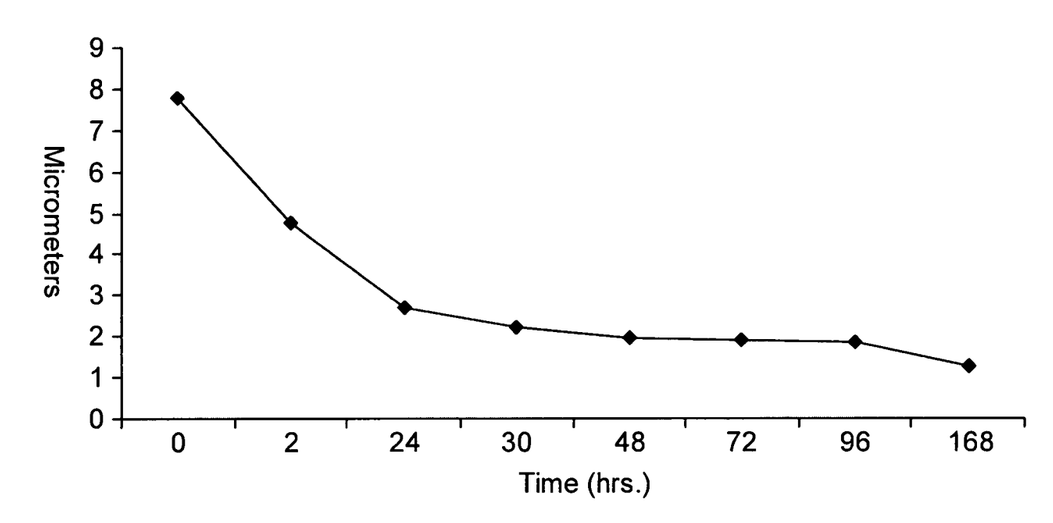
FIG. 1 is a graphical representation of the data shown in Table 2.

The same procedure described for Example 1 was followed except that Adhesive Laminate-2 was used. Tape samples were prepared from the sample of Adhesive Laminate-1 by removing one liner, laminating to a 127 micrometer (5 mil) polyethylene terephthalate film and then removing the other liner and laminating Liner-2 to this construction. 180° Peel Adhesion was measured as described in the Test Method above, immediately after adhesion to the glass plate or after a 24 hour dwell on the glass plate. The results are shown in Table 1. Rebound Testing of a tape sample was made. The results are shown in Table 2 and graphically in FIG. 1.

TABLE 1

| Example | 180° Peel Adhesion Initial (N/dm) | 180° Peel Adhesion After 24 Hour Dwell (N/dm) |
|---|---|---|
| C1 | 60 | 60 |
| 2 | 48 | 62 |

TABLE 2

| Elapsed Time (hours) | Feature Depth (Micrometers) |
|---|---|
| 0 | 7.8 |
| 2 | 4.8 |
| 24 | 2.7 |
| 30 | 2.2 |
| 48 | 2.0 |
| 72 | 1.9 |
| 96 | 1.8 |
| 168 | 1.3 |

Comparative Example C2

For Comparative Example C2 a sample of Adhesive Laminate-3 as obtained was tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 2. Over the same time range as the Peel Adhesion testing, Percent Wet Out was also measured using the Test method above. The results are in Table 3.

Example 3

For Example 3 a sample of Adhesive Laminate-3 was obtained and the release liner was removed and Liner-2 was laminated to the PSA using a laminator. The thus formed tape samples were tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 3. Over the same time range as the Peel Adhesion testing, Percent Wet Out was also measured using the Test method above. The results are in Table 4.

TABLE 3

| Example | 180° Peel after 5 minutes (N/dm) | 180° Peel after 15 minutes (N/dm) | 180° Peel after 30 minutes (N/dm) | 180° Peel after 60 minutes (N/dm) | 180° Peel after 120 minutes (N/dm) | 180° Peel after 180 minutes (N/dm) | 180° Peel after 24 hours (N/dm) | 180° Peel after 48 hours (N/dm) |
|---|---|---|---|---|---|---|---|---|
| C2 | 40 | 43 | 46 | 48 | 48 | 46 | 49 | 52 |
| 3 | 30 | 37 | 45 | 48 | 49 | 51 | 50 | 50 |

TABLE 4

| Example | Wet Out Initial (%) | Wet Out after 5 minutes (%) | Wet Out after 15 minutes (%) | Wet Out after 30 minutes (%) | Wet Out after 60 minutes (%) | Wet Out after 120 minutes (%) | Wet Out after 180 minutes (%) | Wet Out after 24 hours (%) | Wet Out after 48 hours (%) |
|---|---|---|---|---|---|---|---|---|---|
| C2 | 85.6 | 90.0 | 95.0 | 95.3 | 96.4 | 95.4 | 95.4 | 98.6 | 100 |
| 3 | 70.3 | 76.0 | 84.8 | 82.0 | 82.0 | 88.3 | 94.6 | 99.8 | 100 |

Comparative Example C3

For Comparative Example C3 the same procedure was followed as for Comparative Example C2 except that Adhesive Laminate-4 was used in place of Adhesive Laminate-3. Peel Adhesion results are shown in Table 5. Over the same time range as the Peel Adhesion testing, Percent Wet Out was also measured using the Test method above. The results are in Table 6.

Example 4

For Example 4 the same procedure was followed as for Example 3 except that Adhesive Laminate-4 was used in place of Adhesive Laminate-3. Peel Adhesion results are shown in Table 5. Over the same time range as the Peel Adhesion testing, Percent Wet Out was also measured using the Test method above. The results are in Table 6.

TABLE 5

| Example | 180° Peel after 5 minutes (N/dm) | 180° Peel after 15 minutes (N/dm) | 180° Peel after 30 minutes (N/dm) | 180° Peel after 60 minutes (N/dm) | 180° Peel after 120 minutes (N/dm) | 180° Peel after 180 minutes (N/dm) | 180° Peel after 24 hours (N/dm) | 180° Peel after 48 hours (N/dm) |
|---|---|---|---|---|---|---|---|---|
| C3 | 35 | 40 | 43 | 43 | 51 | 51 | 48 | 51 |
| 4 | 42 | 40 | 43 | 46 | 49 | 49 | 51 | 53 |

TABLE 6

| Example | Wet Out Initial (%) | Wet Out after 5 minutes (%) | Wet Out after 15 minutes (%) | Wet Out after 30 minutes (%) | Wet Out after 60 minutes (%) | Wet Out after 120 minutes (%) | Wet Out after 180 minutes (%) | Wet Out after 24 hours (%) | Wet Out after 48 hours (%) |
|---|---|---|---|---|---|---|---|---|---|
| C3 | 100 | 100 | 100 | 100 | 100 | 100 | 100 | 100 | 100 |
| 4 | 79.5 | 88.9 | 91.8 | 92.0 | 91.8 | 96.6 | 98.3 | 100 | 100 |

Comparative Example C4

For Comparative Example C4 a sample of Adhesive Laminate-5 as obtained was tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 7.

Example 5

For Example 5 a sample of Adhesive Laminate-5 was obtained and the release liner was removed and Liner-2 was laminated to the PSA using a laminator. The thus formed tape samples were tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 7.

TABLE 7

| Example | 180° Peel after 5 minutes (N/dm) | 180° Peel after 15 minutes (N/dm) | 180° Peel after 30 minutes (N/dm) | 180° Peel after 60 minutes (N/dm) | 180° Peel after 120 minutes (N/dm) | 180° Peel after 180 minutes (N/dm) | 180° Peel after 24 hours (N/dm) | 180° Peel after 48 hours (N/dm) |
|---|---|---|---|---|---|---|---|---|
| C4 | 6.2 | NM | 18.4 | 20.1 | NM | 20.6 | 30.4 | 32.1 |
| 5 | 8.3 | 7.9 | 8.3 | 9.8 | 10.5 | 12.8 | 20.9 | 27.5 |

NM = Not Measured

Comparative Example C5

For Comparative Example C5 a sample of Adhesive Laminate-6 as obtained was tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 8.

Example 6

For Example 6 a sample of Adhesive Laminate-6 was obtained and the release liner was removed and Liner-2 was laminated to the PSA using a laminator. The thus formed tape samples were tested for 180° Peel Adhesion as described in the Test Method above. Peel Adhesion samples were tested at 5 minutes dwell, 15 minutes dwell, 30 minutes dwell, 60 minutes dwell, 120 minutes dwell, 180 minutes dwell, 24 hour dwell and 48 hour dwell. The results are shown in Table 8.

TABLE 8

| Example | 180° Peel after 5 minutes (N/dm) | 180° Peel after 15 minutes (N/dm) | 180° Peel after 30 minutes (N/dm) | 180° Peel after 60 minutes (N/dm) | 180° Peel after 120 minutes (N/dm) | 180° Peel after 180 minutes (N/dm) | 180° Peel after 24 hours (N/dm) | 180° Peel after 48 hours (N/dm) |
|---|---|---|---|---|---|---|---|---|
| C5 | 49.3 | 41.2 | 55.9 | 54.0 | 56.0 | 52.0 | 50.2 | 52.6 |
| 6 | 32.8 | 28.1 | 38.4 | 42.2 | 41.9 | 50.2 | 34.6 | 40.9 |

Comparative Example C6

For Comparative Example C6 a sample of Adhesive Laminate-7 as obtained was tested by preparing laminates between 2 glass plates or 2 PMMA plates. The laminates were prepared by removing the bottom liner, applying to the substrate, and rolling over the laminate with a hand roller. The top liner was then removed and the second substrate was laminated to it using a hand roller. The laminate was inspected using the Visual Inspection Test Method above, both initially and after 24 hour dwell. The results are shown in Table 9.

Example 7

For Example 7 a sample of Adhesive Laminate-7 was obtained and the top and bottom release liners were removed and 2 pieces of Liner-2 were laminated to the PSA with the microstructured face of the liner into the adhesive. The thus formed tape samples were tested by preparing laminates between 2 glass substrates or 2 PMMA substrates. The laminates were prepared by removing the bottom liner, applying the tape to the substrate and rolling a hand roller over the laminate. The top liner was then removed and the second substrate was laminated to it using a hand roller. The laminate was inspected using the Visual Inspection Test Method above, both initially and after 24 hour dwell. The results are shown in Table 9.

Example 8

For Example 8 a sample of Adhesive Laminate-7 was obtained and the top and bottom release liners were removed and 2 pieces of Liner-2 were laminated to the PSA. In this instance the top piece of Liner-2 was laminated with the microstructured face of Liner-2 into the adhesive and the bottom piece of Liner-2 was laminated with flat side of Liner-2 against the adhesive. The thus formed tape samples were tested by preparing laminates between 2 glass substrates or 2 PMMA substrates. The laminates were prepared by removing the bottom liner, applying the tape to the substrate and rolling a hand roller over the laminate. The top liner was then removed and the second substrate was laminated to it using a hand roller. The laminate was inspected using the Visual Inspection Test Method above, both initially and after 24 hour dwell. The results are shown in Table 9.

TABLE 9

| | Glass Substrates | | PMMA Substrates | |
|---|---|---|---|---|
| Example | Visual Inspection Rating Initial | Visual Inspection Rating After 24 hours | Visual Inspection Rating Initial | Visual Inspection Rating After 24 hours |
| C6 | 2 | 2 | 2 | 2 |
| 7 | 5 | 5 | 5 | 5 |
| 8 | 5 | 5 | 5 | 5 |

A number of embodiments of the invention have been described. Nevertheless, it will be understood that various modifications may be made without departing from the spirit and scope of the invention. Accordingly, other embodiments are within the scope of the following claims.

What is claimed is:

1. A method of making a microstructured adhesive article comprising:
(a) providing an article comprising a crosslinked pressure sensitive adhesive layer disposed on a backing, wherein the crosslinked pressure sensitive adhesive layer has a thickness of from about 10 micrometers to about 1500 micrometers, wherein the crosslinked pressure sensitive adhesive does not interfere with light transmission of light in the visible region, having a luminous transmittance of at least 95% and a haze of less than 5% as measured according to ASTM D 1003-95 after dry lamination; and
(b) embossing the surface of the crosslinked pressure sensitive adhesive layer with a microstructured liner or a molding tool to form a crosslinked pressure sensitive adhesive layer having a microstructured adhesive surface structure, wherein the structure consists of V-grooves or channels and wherein the surface structure is unstable when not in contact with the microstructured liner or molding tool, and the adhesive layer is able to wet out a substrate surface by flattening of the microstructured surface structures and displays complete wet out to a glass substrate after 48 hours.

2. A method according to claim 1 wherein embossing comprises contacting the surface of the crosslinked pressure sensitive adhesive layer with a microstructured release liner.

3. A method according to claim 1 wherein embossing comprises contacting the surface of the crosslinked pressure sensitive adhesive layer with a microstructured molding tool.

4. A method according to claim 1 wherein the crosslinked pressure sensitive adhesive layer comprises a covalently crosslinked pressure sensitive adhesive layer.

5. A method according to claim 1 wherein the crosslinked pressure sensitive adhesive layer comprises a physically crosslinked pressure sensitive adhesive layer.

6. A method according to claim 1 wherein the crosslinked pressure sensitive adhesive layer comprises a crosslinked acrylic adhesive layer.

7. A method according to claim 1 wherein the backing on which the crosslinked pressure sensitive adhesive layer is disposed is removable from the adhesive layer.

8. A method according to claim 1 wherein the backing on which the crosslinked pressure sensitive adhesive layer is disposed comprises a microstructured release liner.

9. A method according to claim 1 wherein the crosslinked pressure sensitive adhesive layer having a microstructured adhesive surface is capable of being dry laminated to a substrate to form a laminate, wherein the adhesive layer has a haze value after dry lamination, measured according to ASTM D 1003-95, of less than about 50% of the haze value of the layer prior to lamination.

10. A method according to claim 1 wherein the crosslinked pressure sensitive adhesive layer having a microstructured adhesive surface is capable of being dry laminated to a substrate to form a laminate, wherein the adhesive layer has an opacity value of less than about 3% after dry lamination.

11. A microstructured adhesive article prepared according to the method of claim 1.

12. An article comprising a crosslinked pressure sensitive adhesive layer disposed on a structured liner, wherein the crosslinked pressure sensitive adhesive does not interfere with light transmission of light in the visible region, having a luminous transmittance of at least 95% and a haze of less than 5% as measured according to ASTM D 1003-95 after dry lamination, and wherein the crosslinked pressure sensitive adhesive has a microstructured surface structure, wherein the surface structure consists of V-grooves or channels and wherein the surface structure is unstable when not in contact with the structured liner, and the adhesive layer is able to wet out a substrate surface by flattening of the microstructured surface structures due to the minimization of the formation of stresses within the adhesive upon removal of the structured liner, and wherein the crosslinked pressure sensitive adhesive layer has a thickness of from about 10 micrometers to about 1500 micrometers, and wherein the crosslinked pressure sensitive adhesive having a microstructured surface structure displays complete wet out to a glass substrate after 48 hours.

* * * * *

UNITED STATES PATENT AND TRADEMARK OFFICE
CERTIFICATE OF CORRECTION

| | | |
|---|---|---|
| PATENT NO. | : 9,555,602 B2 | Page 1 of 1 |
| APPLICATION NO. | : 11/372759 | |
| DATED | : January 31, 2017 | |
| INVENTOR(S) | : Audrey Sherman | |

It is certified that error appears in the above-identified patent and that said Letters Patent is hereby corrected as shown below:

In the Specification

Column 2
Line 64, Delete "Kunstoff" and insert -- Kunststoff --, therefor.

Column 5
Line 11, Delete "propianate]" and insert -- propionate] --, therefor.

Column 6
Line 11, Delete "terpentine" and insert -- turpentine --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*